United States Patent
Borkenhagen et al.

[11] Patent Number: 5,967,958
[45] Date of Patent: Oct. 19, 1999

[54] HEATABLE ROLLER

[75] Inventors: Werner Borkenhagen, Krefeld; Peter Hader, Kempen; Klaus Kubik, Krefeld, all of Germany

[73] Assignee: Eduard Küsters Maschinenfabrik GmbH & Co. KG, Krefeld, Germany

[21] Appl. No.: 08/945,878

[22] PCT Filed: Apr. 23, 1996

[86] PCT No.: PCT/DE96/00701

§ 371 Date: Nov. 3, 1997

§ 102(e) Date: Nov. 3, 1997

[87] PCT Pub. No.: WO96/35839

PCT Pub. Date: Nov. 14, 1996

[30] Foreign Application Priority Data

May 9, 1995 [DE] Germany ............ 195 16 882
Jun. 29, 1995 [DE] Germany ............ 295 10 512

[51] Int. Cl.⁶ .................................................. B23P 15/00
[52] U.S. Cl. .................... 492/46; 162/375; 162/206; 162/207
[58] Field of Search ............... 492/46; 165/89, 165/90, 86, 104.25; 162/375, 206, 207, 359.1

[56] References Cited

U.S. PATENT DOCUMENTS

| | | | |
|---|---|---|---|
| 3,965,334 | 6/1976 | Asselman et al. | 219/399 |
| 4,077,466 | 3/1978 | Fleissner | 165/89 |
| 4,414,464 | 11/1983 | Cloutier | 219/312 |
| 4,735,073 | 4/1988 | Schrors | 72/200 |
| 4,888,464 | 12/1989 | Shibata et al. | 492/46 |
| 4,955,433 | 9/1990 | Zaoralek | 165/89 |
| 5,072,497 | 12/1991 | Zaoralek et al. | 29/123 |
| 5,151,576 | 9/1992 | Zaoralek | 219/469 |
| 5,370,177 | 12/1994 | Fey et al. | 492/46 |
| 5,549,154 | 8/1996 | Niskanen et al. | 165/89 |
| 5,843,282 | 12/1998 | Schmitt et al. | 492/46 |

*Primary Examiner*—David P. Bryant
*Assistant Examiner*—Marc W. Butler
*Attorney, Agent, or Firm*—Kenyon & Kenyon

[57] ABSTRACT

A heatable roller which can be heated from inside the roller body by a heating device. Provided radially outside the heating device are axially parallel bore holes uniformly distributed over the periphery of the roller body which are connected at the ends by annular chambers. The bore holes and the annular chambers form a closed system which is partially filled with water. This system operates to make the temperature uniform via condensation heating in the event of local temperature reduction.

23 Claims, 3 Drawing Sheets

HEATABLE ROLLER

FIELD OF THE INVENTION

The invention relates to a heatable roller of the type having a cylindrical roller body rotatably mounted about its axis, the roller body having a first cavity disposed therein, and a second cavity disposed radially outside of the first cavity. The first cavity has a heating device extending over a length of the heatable roller. The second cavity includes a plurality of elongated channels uniformly distributed over the periphery of the roller body partially filled with a liquid that vaporizes at a temperature produced by the heating device.

BACKGROUND OF THE INVENTION

Such a roller is known from a company publication of the Japanese firm Tokuden. Provision is made inside the roller, coaxially to its axis, for a coil arrangement which heats the roller body inductively from inside. Disposed radially outside of the coil arrangement in the roller body are bore holes which are parallel to the axis and are partially filled with water, because water has the greatest evaporation heat and, thus, the greatest temperature-adjustment effect during condensation. The bore holes are each closed individually at the ends in a pressure-resistant manner. If a temperature drop occurs at a bore-hole location during operation, the vapor in the free space of the hollow chamber not filled by water condenses there and produces a condensation temperature-rise which immediately brings the location in question to the temperature of the ambient environment. Thus, there is an automatic equalization of temperature over the roller-body surface.

The elongated channels can be produced in the roller body at relatively low cost using known means, leaving the stability of the roller body essentially intact. The expression "elongated channel" is used to imply that the cross-section is not important, and that the channels have a length amounting to a multiple, e.g. 20 to 150 times, the cross-sectional dimension. In practice, they are "peripheral" bore holes introduced into the roller body near the outer periphery.

Axially parallel bore holes have been known for quite some time in connection with the heating of rollers. For example, German Utility Model Patent 90 14 117 discloses axially parallel bore holes, that, however, do not form a closed system, but rather are traversed by the flow of a heat-carrier liquid which is heated outside of the roller and transferred by pumping. In the German 40 33 986 A1, bar-shaped, electrical heating elements are arranged in the peripheral bore holes.

In the specific embodiment of the species, the elongated channels must be individually partially filled to a specific level with water and then sealed off in a pressure-tight manner. In addition, after being partially filled with water, the channels must be evacuated, since otherwise air pockets form in the channels and hinder vapor condensation. Because evacuation is necessary, only individually sealing off the channels by welding them closed or by using screw plugs comes into consideration. This requires a considerable expense which may have to be repeated over the service life of the roller. For example, when the roller must be re-engraved, the surface must be heat-treated, making it necessary to empty the elongated channels. It is then necessary to refill the elongated channels with precisely measured volumes of water, and subsequently to evacuate them. The volume of water in each elongated channel should conform, otherwise the condensation heating of the individual channels will not create uniform heating over the periphery of the roller body.

SUMMARY AND OBJECTS OF THE INVENTION

The underlying object of the invention is the further development of a roller of this general type that will improve its properties during operation and reduce expenditure when starting up or shutting down operation.

This objective is fulfilled by providing a heatable roller of the type having a cylindrical roller body rotatably mounted about its axis, the roller body having an outer periphery that forms a working roller periphery, a first cavity arrangement disposed therein, and a second cavity arrangement disposed radially outside of the first cavity arrangement. The first cavity arrangement has a heating device extending over a length of the heatable roller in its longitudinal direction, at least over a working width of the heatable roller. The second cavity arrangement has a plurality of elongated channels, the plurality of elongated channels being axially parallel, more holes closed at the ends, uniformly distributed over the periphery of the roller body, and partially filled with a liquid that vaporizes at a temperature produced by the heating device. The heatable roller further provides an annular chamber that interconnects the plurality of elongated channels on an end of the plurality of elongated channels, the annular chamber having a separate, sealable inlet channel accessible from outside the heatable roller.

The elongated channels distributed over the periphery are interconnected by an annular chamber. This arrangement ensures that the water volumes in the individual channels are automatically adjusted during operation, thus providing for an even temperature distribution over the periphery of the roller. The annular chamber also simultaneously offers the capability of filling and emptying all the axially parallel channels at one time using a single inlet channel, as well as the capability of producing a vacuum in all the channels. Thus, it is no longer necessary to fill the channels individually, while taking care that the water volumes are identical; rather, it is only necessary to supply or remove a single quantity of water at one location. Another important advantage is that all of the axially parallel channels are sealed off at this single location, that is, the inlet channel, to form a closed system.

Taken by themselves, annular chambers into which axially parallel channels open are known from the German patents 33 26 746 A1 and 38 38 726 A1. However, the known specific embodiments do not have a closed channel system, but rather, the axially parallel channels are traversed by the flow of a heat-carrier liquid.

The channels may be expediently designed such that the annular chamber radially overlaps a cross-section of the plurality of elongated channels.

One refinement of the invention which is important in practice deals with producing the annular groove in a manner that can be justified in terms of manufacturing.

This can be carried out advantageously by having the annular chamber formed by an annular recess introduced at an end of the roller body, the annular recess being in fluid communication with the ends of the plurality of elongated channels. The annular groove can be produced by means of a ring-shaped recess that is closed by a retaining ring. Alternatively, the annular groove can also be produced by an inner peripheral offset at the end of the roller body, the inner peripheral offset being closed axially to the outside and radially to the inside by an angular retaining ring.

Since the retaining rings and the plugs are impervious to the fluid they are to contain and, in some instances, must be able to withstand high pressures, it is advisable to weld them along their jointing zone, i.e. along the two longitudinal edges of the retaining rings and at the periphery of the plugs.

In the preferred exemplary embodiment of the invention, the cylindrical roller body has attached roller journals. In accordance with one embodiment of the invention, roller journals can be so configured that they cover the jointing zone, so that even in the event of a burst welding seam, the damage location is contained by the roller journal, thus preventing parts from scattering explosively under high vapor pressure.

The roller journal can be designed, for example, such that it includes an end surface which is transverse to the axis of the roller body, the end surface making contact against an end face of the roller body, and a cylindrical centering collar engaging with the end of the roller body, and wherein the roller journal covers the jointing zones of the welds for the plugs and retaining rings of the heatable roller.

The roll journals may be axially-equal or coaxial with the roller body, and the inlet channel can run through a wall of the roller journal and discharge in the end area of the roll journal. The inlet channel may also discharge in an end face of the roll journal or axle journal, the end face being overlapped by the cover plate such that the inlet channel is sealable in a rotatably fixed manner.

According to a further embodiment of the invention, the end plate can have a sealable connection which is in communication with the inlet channel in the roller journal via a connecting channel formed in the end plate.

Another advantage of the annular-chamber arrangement is that all the axially parallel channels can be safeguarded simultaneously by one single pressure-relief safety mechanism which can be constructed and mounted such that a pressure-relief safety mechanism having a rupture disk is inserted in the sealable connection, located, for example, in the cover plate, and wherein the pressure-relief safety mechanism seals the sealable connection.

The arrangement of a vacuum check valve, for example, in a connecting channel on the inner side of a pressure relief valve of the roller is useful in order to be able to retain the vacuum following evacuation of the channels that are partially filled with water. In this manner, evacuation can be carried out at the connection and the vacuum is maintained when the vacuum pump is removed from the connection. The vacuum is maintained while the pressure relief valve is inserted into the connection, generally by screwing it in. When the pressure in the axially parallel channels rises in response to an increase in temperature, the vacuum check valve opens and the pressure is relieved by the pressure relief valve.

In principle, the first cavity arrangement which accommodates the heating device can likewise be an arrangement of axially parallel bore holes in the roller body and provided radially inside the second cavity arrangement. However, in the preferred specific embodiment of the invention, the first cavity arrangement comprises a single cavity disposed coaxially to the axis.

In a first alternative embodiment, the heating device can comprise a heat-carrier medium that flows lengthwise through the roller body via the more proximate, individual, axially parallel bore holes mentioned above, or in the single available cavity (either via a special heating body, or via an arrangement in which the heat-carrier medium completely fills up the central cavity).

Alternatively, the heating device can also comprise an electrical heating apparatus, for example, in the form of electrical resistance heating-rods or an induction heating apparatus.

If the heating apparatuses are arranged in the single central cavity that is coaxial to the axis of the roller body, they can rotate with the roller body and can be provided with energy by way of at least one swing joint as is described, taken by itself, for resistance-heated radiant heating elements from the essay by Wagner "Die elektrische Walzenheizung" [Electrical Roller Heating] in "die elektrische Ausrüstung" [Electrical Equipment] (Vogel Publishing House, Würzburg) No. 2 of Apr. 20, 1966.

However, according to a further embodiment of the present invention, it is also possible to mount the heating device non-rotatably, which saves the swing joint, and to support the heating device pivotally in the coaxial, central cavity.

DETAILED DESCRIPTION OF THE INVENTION

Figure 1:
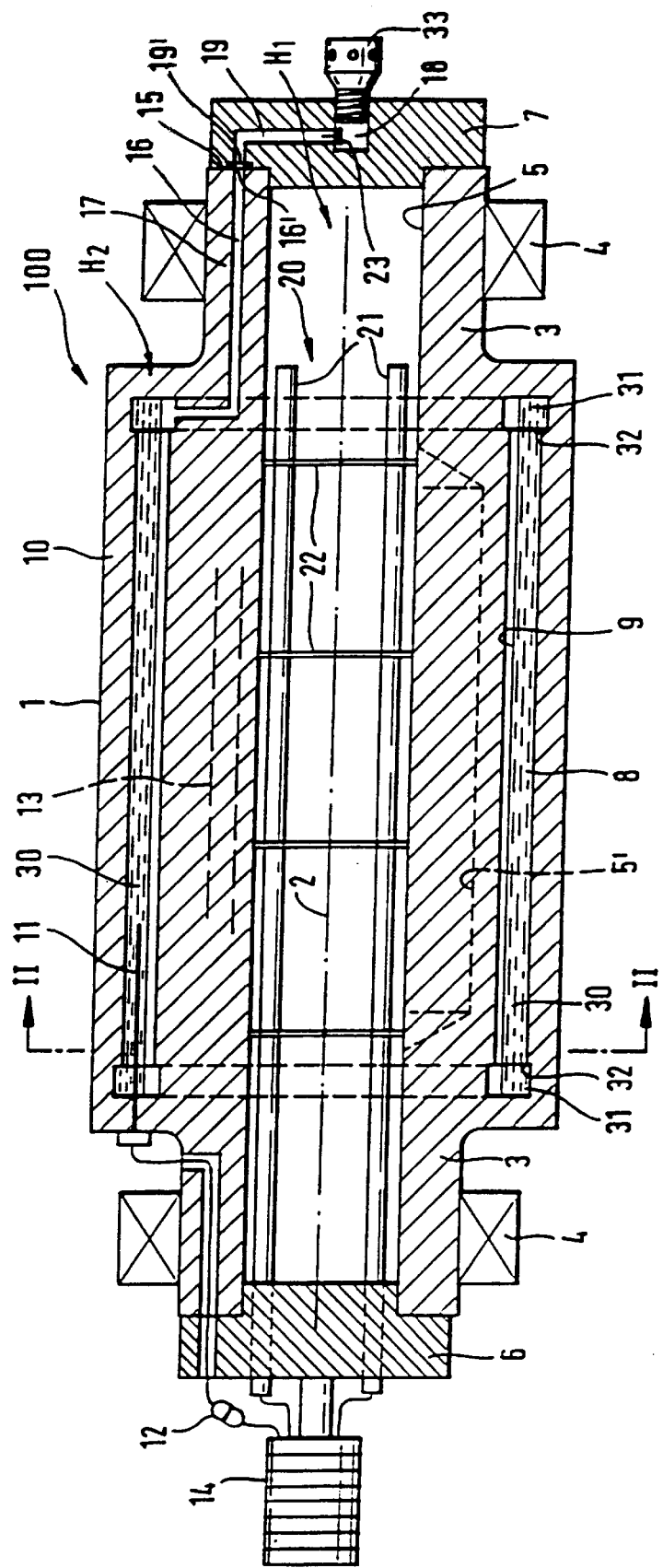
FIG. 1 is a longitudinal, cross-sectional view taken along the axis of an embodiment of a heated roller constructed according to the principles of the invention.
Figure 2:
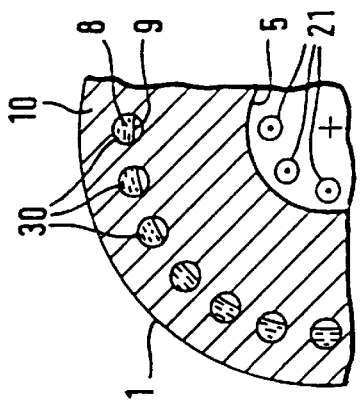
FIG. 2 is a partial cross-section taken along line II—II in FIG. 1.

The roller, denoted as a whole by reference numeral 100, comprises a cylindrical, steel roller body 10 with a working roller-periphery 1 and an axis 2, the roller body 10 having outwardly protruding roller journals 3 at both ends, recessed to a smaller diameter, upon which are arranged bearings 4 for supporting roller 100 in a machine frame or the like. As first cavity arrangement $H_1$, roller body 10 contains a single, cylindrical, inner cavity 5 which is coaxial to axis 2 and in which is arranged an electrical heating device 20. In the exemplary embodiment shown, the heating device 20 is fixed relative to roller body 10 and turns with the roller body 10. The heating device 20 comprises a plurality, e.g. six or eight, axially parallel, electrical resistance heating rods or heating elements 21 on a divided circle, uniformly distributed over the periphery of the inner cavity 5. The heating rods 21 are braced in their mutual arrangement by means of holding disks 22 arranged with axial clearances. The heating rods 21, as shown at the left end of the drawing, extend through an end plate 6 of roller 100. A slip-ring arrangement 14 is provided outside of the roller 100 by which current may be introduced to heat the heating elements 21. An alternative heating device 20 (which corresponds to a possible specific embodiment not shown) may be arranged non-rotatably inside the roller body, such that roller body 10 rotates relative to the heating device 20. In that case, the slip-ring arrangement 14 is not needed and fixed connections can be used to supply the heating energy. Heating device 20 forms an enclosed unit which, after releasing end plate 6, can be pulled to the left out of roller 100, e.g. in case individual heating rods 21 are defective and need to be replaced.

Heating device 20 heats by radiating the peripheral area of cavity 5. The heat is transported radially to the outside by conductance and, at outer periphery 1 of roller 100, is transferred onto the fabric web to be processed. The goal is to have as uniform a temperature distribution as possible at outer periphery 1, primarily in the longitudinal direction of roller 100, but also in the circumferential direction.

The uniformity of the temperature distribution can be disturbed either if the heating rods 21 work unevenly, or if the fabric web picks up uneven amounts of heat, for instance, due to uneven moisture contents.

To counteract the unevenness of the temperature distribution, a second cavity arrangement $H_2$ is provided in roller body 10 radially outside of cavity 5. Cavity arrangement $H_2$ is in the form of axially parallel bore holes 30 which are uniformly distributed over the periphery. The bore holes 30 are arranged on a divided or broken circle and have equal diameters. In the exemplary embodiment, the bore holes 30 are located below the outer periphery 1 by a distance approximately equal to the length of their diameter, and they retain a corresponding unobstructed clearance from one another in the circumferential direction.

Near the ends of the cylindrical roller periphery 1, bore holes 30 are interconnected by annular chambers 31 which extend in a plane transverse to axis 2. In the exemplary embodiment, the annular chambers 31 have a rectangular cross-section in a sectional plane through axis 2. The flank adjacent to bore holes 30 extends radially somewhat beyond the boundaries of the bore holes 30 both inwardly and outwardly, so that their cross-section is overlapped by annular chambers 31.

The right annular chamber 31 in FIG. 1 has an inlet channel 16 which extends through axle journal 3 and discharges at end face 15 of axle journal 3 at 16'.

End face 15 is covered by a cover plate 7 in which is formed a connecting channel 19. At its first end, connecting channel 19 discharges at location 19' opposite location 16' and, in this manner, communicates with inlet channel 16. At its other end, connecting channel 19 opens into a connection 18 which, in the exemplary embodiment, is formed as a tap hole 18 coaxial to the axis 2. Screwed into the tap hole 18 in the state shown in FIG. 1 is a pressure-relief safety mechanism 33, with a rupture disk, which seals the entire system of channels 30 and annular chambers 31 to the outside.

Provided on the inside of pressure-relief safety mechanism 33 or of connection 18 is a vacuum check valve 23, indicated only schematically in FIG. 1, which opens outwardly.

Connection 18 is also used for filling the system with water 8, for emptying the system of water 8, and for evacuating the system after the water has been admitted. After the evacuation, the vacuum connection is unscrewed from connection 18, whereupon vacuum check valve 23 maintains the vacuum. Pressure-relief safety mechanism 33 can then be screwed in.

Bore holes 30 and annular chambers 31 form a closed system that is partially filled with water, in which the pressure rises in conformance with the temperature therein.

During operation, thus when roller 100 is rotating at a considerable speed, water 8, under the action of centrifugal force, is forced against the outer boundary of bore holes 30 and forms a cylindrical, inner level 9. As soon as a lower temperature occurs at one location of the water-free inner boundary of bore hole 30, water vapor condenses there and raises the temperature of that location. Thus, water 8 in the partially filled bore holes 30 functions as an automatic temperature compensation.

The temperature of water 8 can be detected by a thermal sensing device 11 which, when the roller is in motion, is situated outside of inner level 9 of water 8 and thus within the water 8. The signal of the thermal sensing device 11 is routed via a plug connection 12 to one of the slip rings of slip-ring arrangement 14.

Two modifications are indicated with dotted lines in the drawing of FIG. 1. Shown in the upper half as a possible alternative first cavity arrangement $H_1$ are axially parallel bore holes 13 which are located radially inward from the bore holes 30 and which are distributed over the periphery, through which, optionally, in a manner known in the art, a heat-carrier medium may be routed in a meander-shaped liquid guidance This type of heating can replace heating device 20. The other modification comprises a cylindrical enlargement 5' of cavity 5 in the working area of roller periphery 1 and coaxial to axis 2. Cavity 5 reduces the wall thickness of roller body 10 in this area, thus shortening the radial distance through which the heat applied to the inner circumference of roller body 10 has to be transported by conductance.

FIGS. 3 to 6 show possible practical implementations of annular chambers 31 at the ends of longitudinal bore holes 30. In these embodiments, roller journals 3 are added on as separate parts to the actual cylindrical roller body 10.

Figure 3:
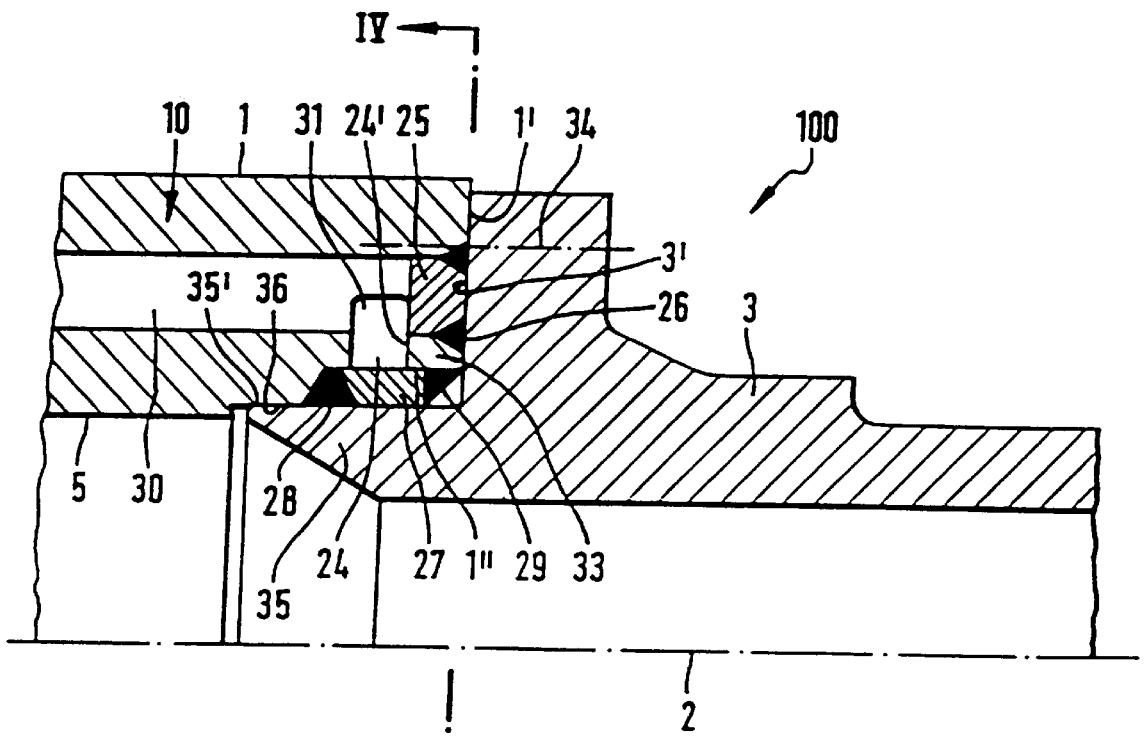
FIG. 3 is a partial longitudinal section through an end area of a roller.

As is illustrated in FIG. 3, longitudinal bore holes 30 forming the channels in cylindrical roller body 10 are introduced from the end face 1' of roller body 10 that is transverse to axis 2.

An inner circumferential groove 24, which in the exemplary embodiment has a substantially U-shaped cross-section, is introduced from the inner circumference 1" of the end of roller body 10 into the end and cuts into longitudinal bore holes 30. A wall thickness of 10 to 30 mm remains between the outer right flank 24' of circumferential groove 24 in FIG. 3 and end face 1' of roller body 10. Longitudinal bore holes 30 continue through this wall thickness, which remains from their production, and are all imperviously sealed by welded-in plugs 25. The jointing zone, i.e., the annular weld, is indicated in the figure via reference numeral 26.

The inside width of circumferential groove 24 is radially overlapped inwardly by a retaining ring 27 having an approximately rectangular cross-section, the longer rectangle sides extending parallel to axis 2. At the two short rectangle sides, retaining ring 27 is welded by welds 28 and 29 to the end of roller body 10 or to the inner edge of wall section 33.

With an end surface 3' that is transverse to the axis, the separate roller journal 3 is placed against end face 1' of roller body 10 and is secured there by axially parallel screws 34 (see FIG. 4), which are distributed over the periphery. Roller journal 3 has an axially projecting centering-collar 35 which, with its outer peripheral surface, lies from inside against an inner peripheral section 36 of roller body 10, and especially against the inner circumference of retaining ring 27.

Thus, roller journal 3 covers the jointing zones, configured as welds 26, 28, 29, from the outside, opposite those in longitudinal bore holes 30 and in the circumferential groove 24 which has become annular groove 31 because of retaining ring 27, so that, in the event that one of the welds fails, no parts can be hurled outwardly.

Figure 5:
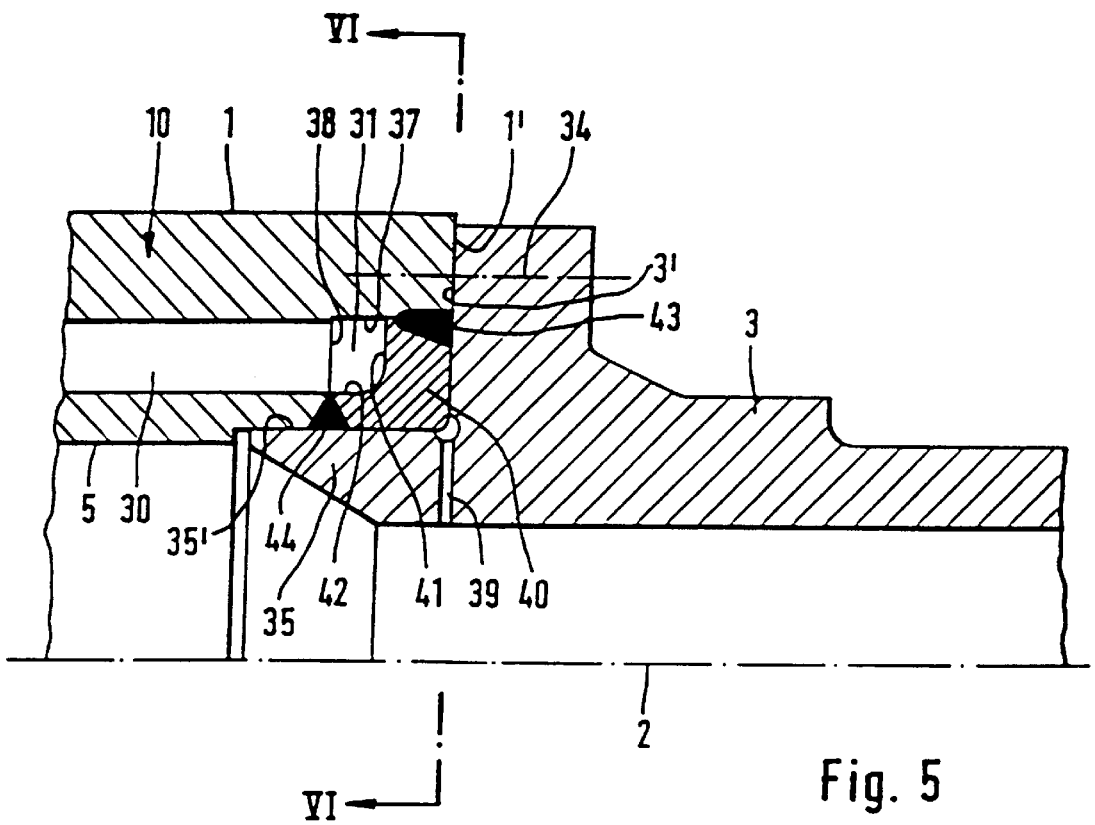
FIGS. 5 and 6 provide views similar to those of FIGS. 3 and 4, for another embodiment of the invention.
Figure 6:
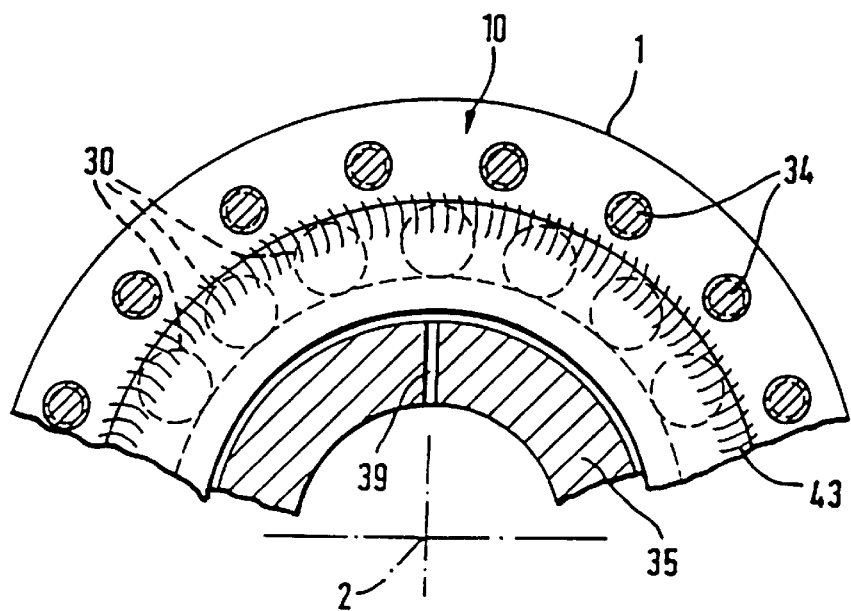

In the specific embodiment shown in FIGS. 5 and 6, an inner shoulder, having a cylindrical, outside wall section 37 and a shoulder-like wall section 38 projecting inwardly and transversely to axis 2 thus forming an inner peripheral offset, is screwed into end face 1' of roller body 10. Longitudinal bore holes 30 are introduced into the shoulder-like wall section 38, which thus extends over the entire cross-section of the longitudinal bore holes 30. After completion of the longitudinal bore holes, an angular retaining ring 40 is welded in a cross-section that traverses the axis. One radial leg 41 of the retaining ring forms the flank of annular groove 31 opposite shoulder 38, while the other leg 42 represents the radially inner delimitation of annular groove 31. Retaining ring 40 is welded at both of its edges by welds 43, 44 to the outer edge of cylinder surface 37 or to the inner edge of shoulder surface 38.

Figure 4:
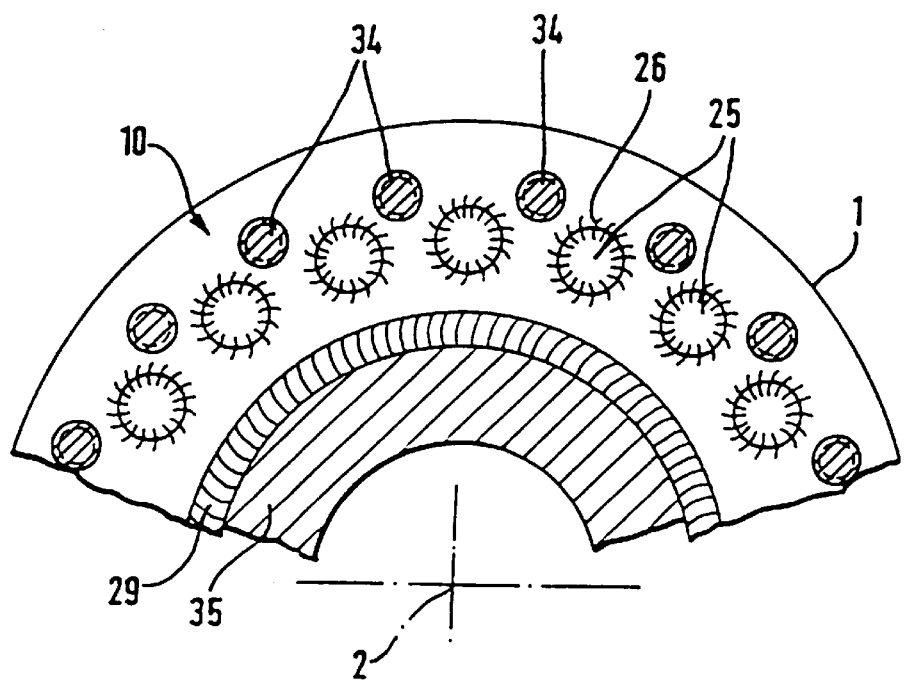
FIG. 4 is a view taken along the line IV—IV in FIG. 3.

The jointing zone formed by welds 43, 44 is covered, in the same manner as in the exemplary embodiment of FIGS. 3 and 4, by end surface 3' that is transverse to axis 2, and outer periphery 35' of centering collar 35. 39 is a pressure-relief bore hole which starts from the apex between end surface 3' and outer periphery 35' of centering collar 35 as shown in the drawing.

What is claimed is:

1. A heatable roller, comprising:
    a cylindrical roller body, rotatably mounted about its axis, having an outer periphery that forms a working roller periphery, a first cavity arrangement disposed therein, and a second cavity arrangement disposed radially outside of the first cavity arrangement;
    the first cavity arrangement having a heating device extending over a length of the heatable roller in its longitudinal direction, at least over a working width of the heatable roller;
    the second cavity arrangement having a plurality of elongated channels, the plurality of elongated channels being axially parallel, closed at the ends, uniformly distributed within the roller body near the outer periphery of the roller body, and partially filled with a liquid that vaporizes at a temperature produced by the heating device; and
    an annular chamber that interconnects the plurality of elongated channels on an end of the plurality of elongated channels, the annular chamber having a separate, sealable inlet channel accessible from outside the heatable roller.

2. The roller as defined by claim 1, wherein the annular chamber radially overlaps a cross-section of the plurality of elongated channels.

3. The roller as defined by claim 1, wherein the annular chamber is formed by an annular recess introduced at an end of the roller body, the annular recess being in fluid communication with the ends of the plurality of elongated channels.

4. The roller as defined by claim 3, wherein the annular chamber comprises an inner circumferential groove starting from an inner circumference of an end of the roller body and cutting into the ends of the plurality of elongated channels, the inner circumferential channel being closed by a retaining ring covering an inside cross-section of the inner circumferential groove radially to the inside, the plurality of elongated channels passing through an outer flank of the inner circumferential groove, and the plurality of elongated channels being axially closed by plugs inserted in the ends thereof.

5. The roller as defined by claim 4, wherein the retaining ring and plugs are welded along joining zones.

6. The roller as defined claim 5, further comprising a roller journal attached to an end of the roller body, the roller journal covering the jointing zones.

7. The roller as defined by claim 6 wherein the roller journal comprises:
    an end surface which is transverse to the axis of the roller body, the end surface making contact against an end face of the roller body; and
    a cylindrical centering collar engaging with the end of the roller body.

8. The roller as defined by claim 3, wherein the annular chamber comprises an inner peripheral offset at the end of the roller body, the inner peripheral offset being closed axially to the outside and radially to the inside by an angular retaining ring.

9. The roller as defined by claim 1, wherein the roller body has coaxial roller journals at the ends thereof, and the inlet channel extends through a wall of one of the roller journals and discharges in an end area of the roller journal.

10. The roller as defined by claim 9, wherein the inlet channel discharges out an end face of one of the roller journals, and the end face is overlapped by a cover plate, the cover plate sealing the inlet channel in a rotatably fixed manner.

11. The roller as defined by claim 10, wherein a sealable connection is formed in the cover plate, the sealable connection communicating with the inlet channel via a connecting channel formed in the cover plate.

12. The roller as defined by claim 11, further comprising a pressure-relief safety mechanism having a rupture disk, the pressure-relief safety mechanism being inserted in and sealing the sealable connection.

13. The roller as defined by claim 12, further comprising a vacuum check valve disposed in the connecting channel between the pressure-relief safety mechanism and the annular chamber.

14. The roller as defined by claim 1, comprising means to protect the annular chamber against excessively high pressures.

15. The roller as defined by claim 14, further comprising a pressure-relief safety mechanism having a rupture disk, the pressure-relief safety mechanism being inserted in and sealing the sealable connection.

16. The roller as defined by claim 1, wherein the first cavity arrangement comprises a single cavity coaxial to the axis of the roller body.

17. The roller as defined by claim 16 wherein the heating device is arranged non-rotatably and is pivotally supported in the single cavity.

18. The roller as defined by claim 1, wherein the heating device comprises a heat-carrier medium flowing lengthwise through roller body.

19. The roller as defined by claim 1, wherein the heating device comprises an electrical heating apparatus.

20. The roller as defined by claim 1, wherein the heating device comprises electrical resistance heating rods.

21. The roller as defined by claim 1, wherein the heating device is an induction device.

22. The roller as defined by claim 1, wherein the heating device rotates with roller body and is energized by way of at least one swing joint.

23. A heatable roller assembly, comprising:
    a cylindrical roller body, rotatably mounted about a longitudinal axis, said roller body having an outer peripheral surface, a first cavity disposed therein, and a second cavity arrangement disposed radially outside of the first cavity arrangement, the second cavity arrangement having a plurality of elongated channels, the plurality of elongated channels being axially parallel, closed at the ends, uniformly distributed along a region near the outer peripheral surface of the roller body, and partially filled with a liquid that vaporizes at a temperature produced by the heating device; and an annular chamber that interconnects the plurality of elongated channels on an end of the plurality of elongated channels, the annular chamber having a separate, sealable inlet channel accessible from outside the heatable roller;

a seal for selectively closing the inlet channel;

a heating device located within the first cavity that extends over a length of the roller body for at least a working width of the roller body; and a roller journal at each end of the roller body.

* * * * *

UNITED STATES PATENT AND TRADEMARK OFFICE
CERTIFICATE OF CORRECTION

PATENT No. : 5,967,958

DATED : October 19, 1999

INVENTOR(S): Werner Borkenhagen; Peter Hader and Klaus Kubik

It is certified that error appears in the above-identified patent and that said Letters Patent is hereby corrected as shown below:

Column 2, line 20, "parallel, more" should be - -parallel, bore - -.

Signed and Sealed this

Sixth Day of March, 2001

Attest:

NICHOLAS P. GODICI

*Attesting Officer*     *Acting Director of the United States Patent and Trademark Office*